US010193997B2

(12) United States Patent
Poblete et al.

(10) Patent No.: US 10,193,997 B2
(45) Date of Patent: Jan. 29, 2019

(54) ENCODED URI REFERENCES IN RESTFUL REQUESTS TO FACILITATE PROXY AGGREGATION

(71) Applicant: Dell Products L.P., Round Rock, TX (US)

(72) Inventors: Christopher Abella Poblete, Austin, TX (US); Jon Robert Hass, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 15/230,068

(22) Filed: Aug. 5, 2016

(65) Prior Publication Data

US 2018/0041604 A1    Feb. 8, 2018

(51) Int. Cl.
*H04L 29/08*    (2006.01)

(52) U.S. Cl.
CPC ........ *H04L 67/32* (2013.01); *H04L 29/08765* (2013.01); *H04L 67/2804* (2013.01); *H04L 67/2866* (2013.01)

(58) Field of Classification Search
CPC .................................................. H04L 29/08765
See application file for complete search history.

(56) References Cited

U.S. PATENT DOCUMENTS

| 7,337,447 | B2* | 2/2008 | Jimenez | G06F 9/544 |
| | | | | 719/314 |
| 7,516,199 | B2* | 4/2009 | Saika | H04L 67/06 |
| | | | | 709/216 |
| 7,809,848 | B1* | 10/2010 | McDougall | H04L 67/40 |
| | | | | 709/230 |
| 8,745,718 | B1* | 6/2014 | Dufel | H04L 63/0807 |
| | | | | 713/155 |
| 9,258,335 | B1* | 2/2016 | Taylor | H04L 65/1069 |
| 9,432,476 | B1* | 8/2016 | Dong | H04L 67/2857 |
| 9,753,744 | B1* | 9/2017 | Wells | G06F 9/451 |
| 9,804,886 | B1* | 10/2017 | Wells | G06F 9/465 |
| 9,887,856 | B2* | 2/2018 | Kagy | H04L 12/6418 |
| 2003/0061512 | A1* | 3/2003 | Flurry | H04L 63/0815 |
| | | | | 726/4 |
| 2003/0105807 | A1* | 6/2003 | Thompson | H04L 29/06 |
| | | | | 709/203 |

(Continued)

*Primary Examiner* — Lashonda T Jacobs

(74) *Attorney, Agent, or Firm* — Jackson Walker L.L.P.

(57) ABSTRACT

A RESTful API suitable for distributed management tasks implements an aggregator that receives a client request including a URI corresponding to a requested service. The aggregator generates and forwards a proxy request, requesting the same requested service from multiple aggregated resources associated with the aggregator. The aggregator includes, in each proxy request, prefix information that may be used by the aggregated resource to create encoded information that is included in a proxy request response. The aggregator receives the proxy request responses, including the encoded information, and forwards them to the client. The client may then generate a subsequent request for additional information about a resource or service on any one of the aggregated resources. The subsequent request conveys the encoded information to the aggregator, which may then decode the information to identify the appropriate aggregated resource for the request.

19 Claims, 5 Drawing Sheets

(56) References Cited

U.S. PATENT DOCUMENTS

| | | | |
|---|---|---|---|
| 2008/0104124 A1* | 5/2008 | Bao | G06F 21/10 |
| 2008/0249997 A1* | 10/2008 | Sun | G06F 17/30587 |
| 2010/0100952 A1* | 4/2010 | Sample | H04L 51/066 |
| | | | 726/9 |
| 2010/0325245 A1* | 12/2010 | Sibillo | G06F 17/30867 |
| | | | 709/219 |
| 2011/0066741 A1* | 3/2011 | Hoefner | G06F 17/30876 |
| | | | 709/230 |
| 2011/0099277 A1* | 4/2011 | Yao | G06F 17/30873 |
| | | | 709/226 |
| 2014/0033170 A1* | 1/2014 | Nimashakavi | G06F 17/30893 |
| | | | 717/120 |
| 2014/0149574 A1* | 5/2014 | Findeisen | H04L 43/065 |
| | | | 709/224 |
| 2015/0205834 A1* | 7/2015 | Keeton | G06F 17/301 |
| | | | 707/714 |
| 2015/0331675 A1* | 11/2015 | De Magalhaes | G06F 8/20 |
| | | | 717/104 |
| 2017/0230307 A1* | 8/2017 | Li | H04L 47/80 |
| 2017/0344605 A1* | 11/2017 | Wells | G06F 17/30451 |
| 2017/0346875 A1* | 11/2017 | Wells | H04L 65/80 |
| 2018/0046494 A1* | 2/2018 | Wells | G06F 9/465 |

* cited by examiner

409 ↘

GET "https://10.35.175.101/redfish/v1"

419 ↘

{        ← 420    ← 421
    AggProxyPrefix="/redfish?proxied="
    AggEncodingMethod="base64"
    }                 ← 422

410 ↘

GET "https://10.35.175.101/redfish/v1/Managers"

411 ↘

GET "https://192.168.1.102/redfish/v1/Managers"
    HTTP header:      ← 420
       AggProxyPrefix="/redfish?proxied="

AggEncodingMethod="base64"

```
{
    "odata.id" = "/redfish/v1/Managers/SERVICETAG1"
}
                                                    — 413-A {
    "odata.id" = "/redfish/v1/Managers/SERVICETAG1",
    "odata.id" = "/redfish?proxied=aHR0cHM6Ly8xMC4zNS4xNzUuMTAyCg==/redfish/v1/Managers/SERVICETAG2",
    "odata.id" = "/redfish?proxied=aHR0cHM6Ly8xOTIuMTY4LjEuMTAzCg==/redfish/v1/Managers/SERVICETAG3"
}
                                                                                            — 415

GET "https://10.35.175.101/redfish?proxied=aHR0cHM6Ly8xMC4zNS4xNzUuMTAyCg==/redfish/v1/Managers/SERVICETAG2"
                                                                                            — 417

GET "https://10.35.175.102/redfish/v1/Managers/SERVICETAG2"
                                                           — 418

"aHR0cHM6Ly8xMC4zNS4xNzUuMTAyCg=="
                                    — 413-1
```

FIGURE 4C

ENCODED URI REFERENCES IN RESTFUL REQUESTS TO FACILITATE PROXY AGGREGATION

TECHNICAL FIELD

The present disclosure generally relates to information handling systems and, more particularly, techniques for implementing and managing multiple information handling systems.

BACKGROUND

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an IHS may include a variety of hardware and software components that may be configured to process, store, and communicate information and may include one or more computer systems, data storage systems, and networking systems.

An IHS can be configured in several different configurations ranging from a single, stand-alone computer system to a distributed, multi-device computer system, to a networked computer system with remote or cloud storage systems. Any IHS that encompasses multiple computer systems may employ specific information handling resources, methods, protocols, and standards, to implement IHS management. Examples of such IHS management resources include baseboard management controllers (BMCs) and chassis controllers used in IHS racks.

IHS management protocols and standards may reflect one or more prevailing architecture and design paradigms. As an example, the emergence of scale-out architecture for data centers and other data-intensive and transaction-intensive applications has been accompanied by a corresponding emergence of web-like or representational state transfer (REST) compliant application programming interfaces (APIs) to provide a scalable foundation for distributed management. The Redfish API maintained by the Distributed Management Task Force (DMTF) is an example of a REST-compliant or RESTful API.

RESTful APIs may support resources or services that view navigable references, such as a uniform resource identifier (URI), as opaque values that can be used as targets in subsequent RESTful operations. In this manner, RESTful APIs may link together data objects declared within or defined by the API to provide a comprehensive representation of and control model for a particular collection of systems and components.

When an aggregated resource within a RESTful API generates a response that includes a response URI, the response URI necessarily reflects or inherits the context of the aggregated resource. If an intermediary is imposed between an API resource that generates a response and a client that receives the response, the client may receive a response URI that generates an error when included in a subsequent client request.

SUMMARY

In accordance with disclosed subject matter, issues associated with the use of an aggregator interposed between a client and an individual service or resource of a RESTful API are addressed.

In accordance with a disclosed method associated with a an aggregating resource, also referred to herein more simply as an aggregator, of a RESTful API, the aggregator receives a RESTful request, e.g., an HTTP GET request, indicating a URI corresponding to a requested service. The URI may be an absolute URI including a scheme and authority, collectively referred to herein as a URI prefix, of the aggregator and a resource path indicative of the requested service.

The aggregator is configured to aggregate on behalf of a plurality of individual resources, referred to herein as aggregated resources, at least some of which may not be accessible to the client. In at least one embodiment, the aggregator responds to receiving the client request by generating and forwarding a proxy request to each aggregated resource. Each proxy request includes a proxy URI corresponding to the requested service from the aggregated resource. The aggregator is further configured to include, in each proxy request, additional information, referred to herein as prefix encoding information or, more simply, prefix information.

The prefix information, which may also be provided to or made available to the client, may be used to ensure that a URI generated by an aggregated resource and returned to the client resolves correctly when the client uses the URI in a subsequent request routed through the aggregator. In at least one embodiment, the prefix information includes prefix attribute information and encoding information. The prefix attribute information may identify a query attribute and the encoding information may indicate an encoding method or encoding algorithm.

Upon receiving the proxy request from the aggregator, each aggregated resource returns a response, referred to herein as an encoded response, to the aggregator. Each encoded response may include a document URI and a query string. The document URI may reference a service document corresponding to the service requested in the proxy query. The query string may be in the form of an attribute-value pair in which an encoded string or, more simply, encoding is assigned as a value for the query attribute. The encoding may represent the URI prefix of the applicable proxy query encoded according to the encoding method indicated in the prefix information.

The aggregator incorporates each of the encoded responses, as well as its own response to the client request, into a single document, referred to herein as the encoded response and returns the aggregated response to the client.

The client may be configured to use the encoded responses included in the aggregated response to formulate subsequent client requests, referred to herein as encoded client requests, seeking additional information, e.g., additional information about a resource or service indicated by a document URI included in one of the encoded responses. Each encoded client request may include a query string corresponding to the query string in one of the encoded responses. The client may then send the encoded client to the aggregator.

In this manner, the client may generate an encoded client request without ever decoding the encoded string in the applicable encoded response. The client may, however, discover the prefix information and use it to decode the encoded string to discover, for itself, the URI prefix of the applicable aggregated resource. If the client can otherwise access the aggregated resource, the client can generate a directed client request that includes the URI prefix of the aggregated resource, thereby bypassing the aggregator.

Returning to an encoded client request sent by the client to the aggregator, the aggregator is configured to recognize the prefix attribute in the query string of the encoded client request and to decode the value of the prefix attribute, i.e., decode the encoded string, to recover the URI prefix of the applicable aggregated resource. The aggregator may then generate a solo proxy request that includes the URI prefix of the applicable aggregated resource in addition to a URI path corresponding to the additional information requested by the client. The aggregated resource targeted by the solo proxy request may then return a response to the aggregator and the aggregator may forward this response back to the client.

By specifying a URI prefix creation/encoding mechanism with every client request passed through to an aggregator service, the aggregator is freed from having to maintain a database of URI translations that might be otherwise required. In addition, delegating the calculation of the encodings to the aggregated resources beneficially frees the aggregator from the potentially prohibitive task of calculating or otherwise generating encodings for every one of a potentially large number of aggregated resources. These benefits are particularly applicable in recognition of a prevailing preference for horizontally-scaled or "scale out" designs in data centers and other transaction-intensive applications.

Before sending a first request to the aggregator, the client may discover the aggregating capabilities of the aggregator as well as the prefix information used by the aggregator. The encoding method indicated by the prefix information may be a client-decodable encoding method, enabling the client to recover, from the encoded responses included in the aggregated response, URI prefixes for the aggregated resources.

In at least one embodiment, the prefix information indicates an encoding method, e.g., Base64 or another binary-to-ASCII encoding, and identifies a proxy prefix attribute for use in a query string of a GET request or any other suitable RESTful request. The aggregator may advertise a proxy prefix feature to clients and publish the corresponding prefix information, e.g., within a root object of the RESTful API. The RESTful API may be a Redfish API or another RESTful API that employs an Open Data Protocol (OData) architecture.

In accordance with a disclosed method associated with the client resource, also referred to herein more simply as the client, the client sends a RESTful client request to the aggregator. The URI path indicated in the client request corresponds to a requested service.

Again, the aggregator is configured to aggregate on behalf of a plurality of aggregated resources, including aggregated resources that may not be accessible to the client. After the aggregator sends proxy requests and receives encoded responses as described above, the client receives an aggregated response, including all of the encoded responses of the aggregated resources, from the aggregator.

The client may then use the encoded responses to discover, via encoded client requests sent to the aggregator, additional information regarding the aggregated resources. Additionally, an appropriately configured client may discover and use the prefix information to decode the encodings in the encoded responses and thereby recover the URI prefixes of the aggregated resources.

In accordance with a disclosed method associated with an aggregated resource, an aggregated resource may be associated with an aggregator the supports prefix-aware proxying as described above. The aggregated resource may be configured to detect prefix information incorporated within a request from the aggregator. The prefix information may be provided as packet heading information. Embodiments that employ HTTP GET requests, for example, may include the prefix information within the HTTP header.

The aggregated resource may respond to receiving a request that includes prefix information by generating an encoded response. The encoded response may be structured to function as a query portion of a URI used in a subsequent RESTful request. The encoded response may include an explicit indicator of the prefix attribute specified by the aggregator followed by an encoding representing the aggregated resource's URI prefix encoded using the encoding method specified by the aggregator. The encoded response may further include a document URI representing the service document value generated by the aggregated URI for the service requested in the proxy request. Encoding the URI prefix of the aggregated resource beneficially prevents or reduces the likelihood of incurring an error associated with a non-compliant use of URIs including, as an example, a URI or a URI-like string that includes multiple URI schemes and/or multiple URI authorities.

In accordance with a distributed management method of providing an aggregating service, an aggregator receives a client request indicating a URI identifying a resource declared in or otherwise defined by a Redfish API or another suitable REST-compliant API. For each of a plurality of aggregated resources associated with the aggregator, the aggregator may perform proxy operations. The proxy operations may include sending a proxy request corresponding to the client request to the aggregated resource, where the proxy request conveys prefix information indicating, at the least, an encoding algorithm, and replaces the URI prefix of the URI indicated in the client request with a URI prefix of the aggregated resource.

The proxy operations may further include receiving, from each aggregated resource, an encoded response that includes encoded URI information derived from the URI prefix of the aggregated resource and a document URI representing the value of the service requested in the client request as conveyed to the aggregated resource via the proxy request.

The aggregator may include all of the encoded responses in an aggregated response, add its own un-encoded response to the aggregated response, and forward the aggregated response to the client. The client may subsequently generate individual encoded client requests to obtain additional information associated with resources identified by the document URIs. Each encoded client request may convey to the aggregator the encoding of the URI prefix of the applicable aggregated resource. The encoded client request may convey the encoding via an attribute-value pair explicitly indicated in a query portion of the URI for the encoded client request. The aggregator is configured to decode, resolve, or otherwise determine the URI prefix of the applicable aggregated resource from the information conveyed in the encoded client request. The aggregator may then construct a URI by appending the URI path indicated in the encoded client request to the applicable URI prefix and generate, as a proxy for the encoded client request, a GET request indicating the constructed URI. Upon receiving a response, including the requested resource, from the aggregated resource, the response may be forwarded to the client as the response to the encoded client request.

The encoding algorithm may be a client-decodable encoding algorithm such that the client may resolve an absolute URI from encoded URI information and, instead of sending an encoded client request to the aggregator, send a direct request to the aggregated resource, i.e., a request indicating the aggregated resource URI.

The distributed management method may include providing a service root document indicative of the prefix information. In some embodiments, each proxy request comprises a hypertext transfer protocol (HTTP) request wherein the prefix information is conveyed via a header of the HTTP request.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which:

FIG. 3 illustrates a flow diagram of an aggregation process that supports, within a REST-compliant API, dynamic URI prefixing;

FIGS. 4A, 4B, and 4C illustrate example code suitable for use in the aggregation process of FIG. 3.

DETAILED DESCRIPTION

Figures 1, 2:
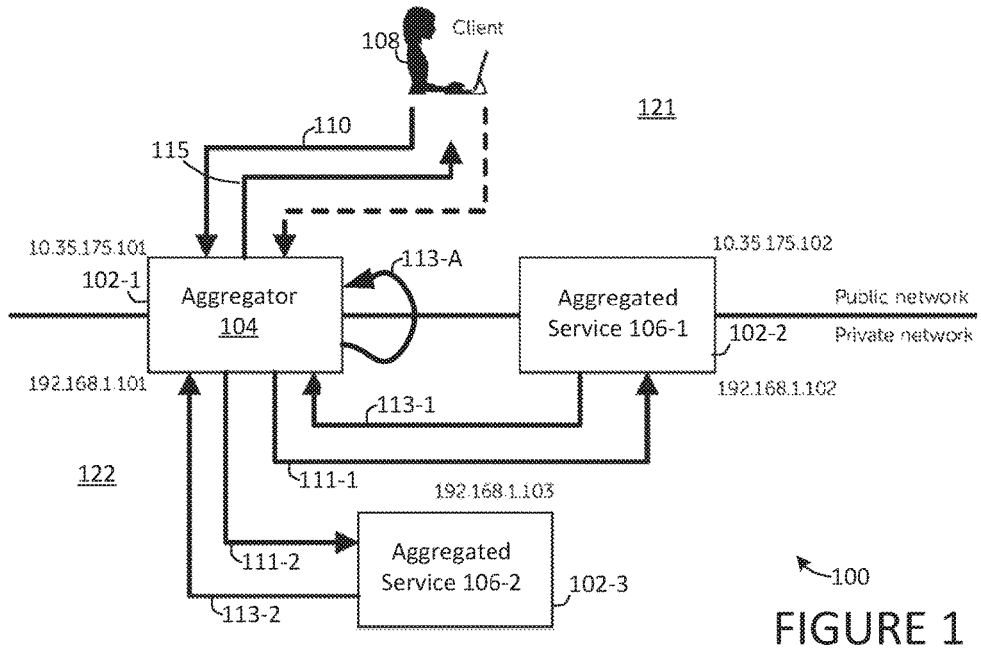
FIG. 1 is block diagram illustrating a sequence of REST-compliant requests and responses suitable for performing distributed management in a data center or other multi-node network or system.
FIG. 2 illustrates request and response examples of the sequence of FIG. 1.

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter. The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

A RESTful API may support the use of a single API resource or service acting as a proxy for a potentially large number of other API resources. The single API resource, which may be referred to as an aggregator or an aggregator resource or service, may receive client requests and pass the requests through to one or more other API resources, any one of which may or may not be directly accessible to the client. As a simple example, a client may wish to retrieve a service tag number for all available resources. Using aggregation, the client may send a single service tag request to the aggregator and the aggregator may then forward an analogous request to each API resource with which the aggregator is associated with the aggregator. After each subordinate API resource responds to the aggregator's request, the aggregator can forward the various responses back to the client. In this manner, the aggregator only needs to know which devices it is aggregating on behalf of and need not maintain, continuing with the service tag example, a table of service tags. The significance of this characteristic increases as the number of nodes increases.

While aggregation has desirable characteristics, aggregation, and the related concept of proxying, may raise issues when the response provided to the aggregator by an aggregated resource may be used without modification by the aggregator, but not by the client. The response from the aggregated resource may, for example, contain URI links and references that resolve perfectly well in requests generated by the aggregator, but less so in requests generated by the client.

One commonly encountered situation that may present such an issue arises when the client does not have direct access to the aggregated services. In this situation, an aggregated service may generate a response that includes a URI prefix that produces an error when used in a request from the client. As used herein, "URI prefix" refers to the portions of a URI commonly referred to as the scheme and authority where, in the URI A://B/C/D?E=F, A indicates the URI scheme, B indicates the URI authority, and the URI prefix is the text string: A://B.

FIG. 1 illustrates selected elements of an information handling system 100. The information handling system 100 illustrated in FIG. 1 includes a group of three information handling system resources 102, including a first IHS resource 102-1, a second IHS resource 102-2, and a third IHS resource 102-3. For purposes of clarity, FIG. 1 illustrates only three IHS resources 102, but the number of resources 102 encompassed by information handling system 100 may be much greater, e.g., $10^N$ where 0<N<~4, depending upon the implementation. The correspondence between IHS resources 102 and distinct physical devices may vary. In at least one embodiment, each IHS resource 102 corresponds to a distinct IHS device, such as a server, desktop, or laptop computer. In other embodiments, two or more IHS resources 102 may comprise elements of a common system. As one non-limiting example, an IHS device may be logically partitioned into two or more partitions and each partition may include one or more IHS resources 102.

The information handling system 100 illustrated in FIG. 1 encompasses horizontally scaled embodiments, also referred to as scale out embodiments, in which each IHS resource 102 may correspond to a distinct computing device or node and the computational capacity of information handling system 100 is adjusted by increasing or decreasing the number of IHS resources 102. Examples of scale out embodiments include rack-based and blade-based server systems, data centers, cloud-based computational resources, and so forth.

In at least some scale out embodiments of information handling system 100, one of the IHS resources 102, e.g., first IHS resource 102-1, may function as an aggregator resource or, more simply, aggregator for two or more other IHS resources 102, e.g., second IHS resource 102-2 and third IHS resource 102-3. In these embodiments, the first IHS resource 102-1 may be referred to as aggregator 104, while the remaining IHS resources 102, including IHS resource 102-2 and IHS resource 102-3 in this example, may be referred to as aggregated services 106. Although the description of the figures below may describe features typically found in scale out systems, information handling system 100 encompasses embodiments that might not be referred to as scale out.

Aggregator 104 may function as an intermediary between a client object or resource identified in FIG. 1 as client 108, and an aggregated service 106. For example, upon receiving a client request 110 from client 108, aggregator 104 may generate and forward an analogous request, referred to herein as a proxy request 111, to each aggregated service 106 associated with aggregator 104. Thus, for the information handling system 100 illustrated in FIG. 1, aggregator 104 sends a first proxy request 111-1 to first aggregated service 106-1 and a second proxy request 111-2 to second aggregated service 106-2. In at least one embodiment, the proxy requests 111 and client request 110 are analogous because they identify an analogous target object or request analogous information from the recipient. As an example, if client request 110 requests service tag information from aggregator 104, first proxy request 111-1 may request service tag information from first aggregated service 106-1 and second proxy request 111-2 may request service tag information from aggregated service 106-2.

FIG. 1 illustrates each aggregated service 106 responding to the applicable proxy request 111 by returning a response referred to herein as an encoded response 113, to aggregator 104. The aggregator 104 may also generate its own response, response 113-A, to client request 110. The aggregator 104 may consolidate all of the encoded responses 113, as well as its own encoded response 113-A, into an aggregated response 115 and forward aggregated response 115 back to client 108.

The IHS resources 102 illustrated in FIG. 2 may represent IHS management resources that enable or support distributed management tasks. For example, one or more of the IHS resources 102 may correspond to a baseboard management controller (BMC) or another type of service processor associated with an IHS. Management resources may implement, support, provide, or comply with an API that defines methods and data objects that clients and other resources may access. In at least some embodiments, information handling system 100 supports a RESTful API such as Redfish and the IHS resources 102 correspond to or are otherwise associated with RESTful API resources.

Referring now to FIG. 2, examples of RESTful API requests and responses corresponding to the requests and responses of FIG. 1 are presented. The GET command 210 illustrated in FIG. 2 is representative of the client request 110 of FIG. 1. GET command 210 consists of the command portion "GET" and an absolute URI ("https://10.35.175.101/redfish/v1/Managers") that references a RESTful API resource. In this particular example, the path portion ("/redfish/v1/Managers") of the URI of GET command 210 conveys that a root object of a Redfish-compliant API resides on the /redfish/v1/ directory of the applicable resource while the prefix portion of GET command 210 ("https://10.35.175.101/"), consisting of the scheme ("https://") and authority ("10.35.175.101") portions of GET command 210, identifies aggregator 104, which has a network interface associated with the IP address 10.35.175.101 on public network 121 (FIG. 1), to which client 108 is also interfaced, as the target of the request.

Whereas a conventional RESTful resource, upon receiving GET command 210, would simply return the requested object to client 108, aggregator 104 is an aggregator resource that generates additional aggregator operations. In FIG. 1 and FIG. 2, operations generated by aggregator 104 in response to receiving GET command 210 from client 108 include the proxy requests 211, including one proxy request 211 for each aggregated service 106 associated with aggregator 104, where each proxy request 211 is analogous to GET command 210. In the context of the RESTful API underlying FIG. 2, analogous operations include operations that share a common path portion. Accordingly, each proxy requests 211 generated by aggregator 104 in response to receiving GET command 210, shares the path portion /redfish/v1/Managers/ in common with GET command 210. However, each proxy request 211 has a unique prefix, corresponding to the IP address of the applicable aggregated service 106. In the example illustrated in FIG. 2, the unique prefix portion of proxy request 211-1 includes the IP address 192.168.1.102 of the first aggregated service 106-1 on private network 122 (FIG. 1), to a network interface of aggregator 104 is connected at the IP address 192.168.1.101. Similarly, the unique prefix portion of proxy request 211-2 includes the IP address 192.168.1.103 of the second aggregated service 106-2 on private network 122.

Each aggregated service 106 responds to receiving proxy request 211 by returning an encoded response 213 to aggregator 104. As illustrated in FIG. 2, each encoded response 213 includes an another URI, referred to herein as the document URI, indicating value returned by the requested service from the aggregated resource. For the example illustrated in FIG. 2, the URI path indicated in the client request /redfish/v1/Managers corresponds to an API service that returns an encoded response 213-1 that includes the document URI /redfish/v1/Chassis/Sled2 from first aggregated service 106-1. The document URI indicates that first aggregated service 106-1 includes a single manager, Sled2, while the document URI /redfish/v1/Chassis/Sled3 in the second encoded response 213-2 indicates that the second aggregated service 106-2 includes a single manager, Sled3. FIG. 2 further illustrates aggregator 104 generating its own response 213-A to client request 110 and incorporating all of the encoded responses 213 into an aggregated response 215 that is then sent back to aggregator 104 as the response to the original client request 110.

If client 108 wishes to request additional information about Sled2, the manager resource associated with first aggregated service 106-1, the manager may, consistent with conventional OData APIs, generate a GET request 218 using the same URI prefix as it used in the original GET request 210, i.e., https://10.35.175.101/. However, because the aggregated service 106 associated with the requested resource does include a network interface at IP address 10.35.175.101 of public network 121, the GET request 218 will precipitate an error or return an incorrect result. In other words, the use of aggregator 104 as a proxy results in an aggregated response 215 that masks URI prefix information for each of the aggregated services 106 from client 108. While this issue might be addressed by configuring aggregator 104 to maintain metadata for each aggregated service 106, doing so would result in a aggregator 104 having disproportionate processing and storage requirements that would impose limitations on scalability and performance.

Figures 3, 4A:
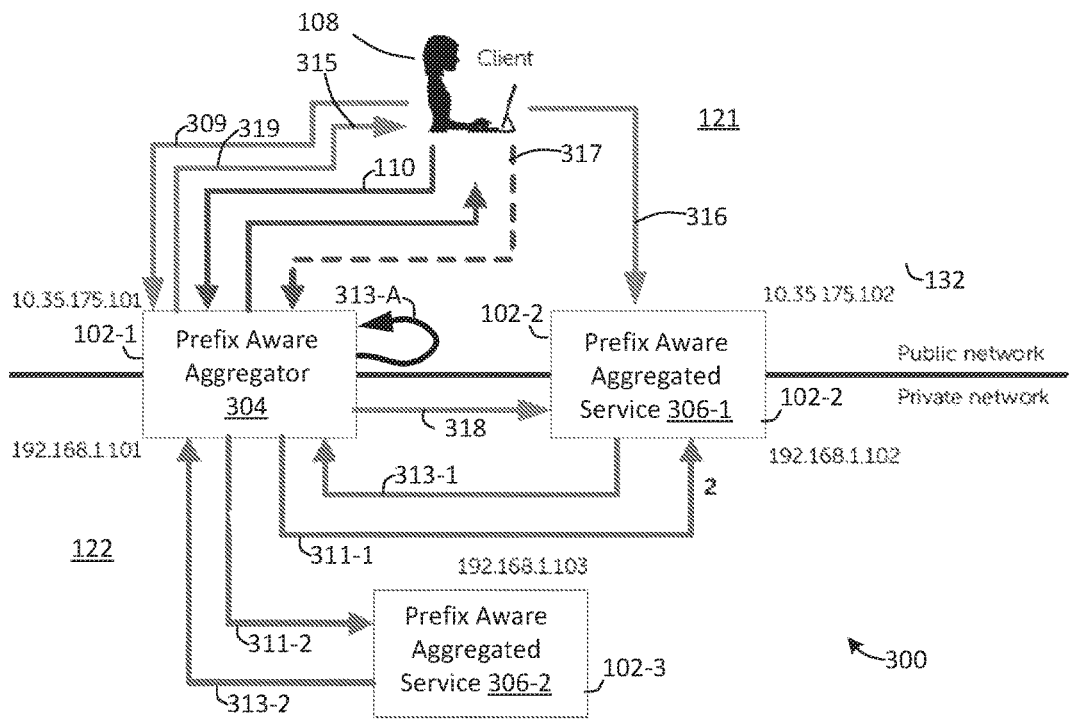

FIG. 3 illustrates examples of "prefix-aware" requests and responses, in accordance with the present invention, that address the URI prefix issue introduced by the use of aggregator 104. In the context of the RESTful API illustrated in FIG. 1 and FIG. 2, the prefix-aware requests and responses of FIG. 3 enable a client receiving an aggregated result from aggregator 104, to explore resources identified in the aggregated result using RESTful requests that contain sufficient prefix information to enable the aggregator or other recipient to resolve the appropriate URI for the particular resource. This solution supports the aggregation concept that is highly desirable in scale out systems and networks without imposing complexity that discourages or prohibits scalability or performance.

In at least one embodiment, the prefix-aware solution discussed in FIG. 3 is achieved using just two pieces of additional information. The first piece of additional information indicates the name or label of a query attribute to be used in a subsequent RESTful request. The second piece of information identifies an encoding method or algorithm. The encoding algorithm might be any suitable algorithm for representing binary information as an ASCII text string. The encoding method may be applied to all or a portion of a URI generated by an aggregated service 106 and the encoded result may be conveyed back to the client 108. The client 108 may use the encoded string directly in a subsequent request sent to the aggregator or decipher the encoding and generate a direct or non-proxied request to the applicable aggregated service 106, assuming that the applicable aggregated service 106 is accessible to aggregator 104.

FIG. 3 and FIGS. 4A-4C illustrate a prefix-aware IHS 300 and example prefix-aware requests and responses used in conjunction with IHS 300. For the sake of simplicity and clarity, elements, requests, or responses that are the same or substantially the same as those depicted in FIG. 1 and FIG. 2 are identified with like reference numerals.

FIG. 3 illustrates client 108 issuing a RESTful request referred to as a proxy discover request 309 to aggregator 304. An example of proxy discover request 309 is the GET request 409 illustrated in FIG. 4A. In at least one embodiment, client 108 discovers the proxy capabilities of aggregator 304 via proxy discover request 309 and the corresponding prefix information necessary to invoke those capabilities successfully. The GET request 409 of FIG. 4A indicates a URI for the root directory service of the Redfish API, i.e., the directory /redfish/v1/.

The aggregator 304 responds to proxy discover request 309 by returning a root service document, i.e., a Redfish API service document 319 to client 108. FIG. 4A illustrates an example API service document 419 including prefix information 420. The prefix information 420 illustrated in FIG. 4A includes prefix attribute information 421 and encoding information 422. The prefix attribute information 421 illustrated in FIG. 4A is a text string that identifies the query attribute "proxied" preceded by the query identifier "?". Although the encoding information 422 illustrated in FIG. 4A indicates base64 as the encoding method or algorithm applicable to this example, other encoding methods may be substituted. In addition, although it is not strictly required that client 108 be able to decode any information encoded according to the indicated encoding technique, at least some embodiments employ a "decodable encoding" that client 108 is able to decode.

Having acquired the prefix information 420 from aggregator 304, client 108 may then send client request 110 to aggregator 304. The client request 110 of FIG. 3 and its corresponding GET request 410 are the same as the client request 110 and GET command 210 of FIG. 1 and FIG. 2. The aggregator 304, upon receiving client request 110 from client 108, generates proxy requests 311 for each aggregated service 306. An example proxy request 311 is illustrated in FIG. 4A by proxy request 411. Unlike the proxy requests 211 illustrated in FIG. 2, the proxy request 411 illustrated in FIG. 4A incorporates the prefix information 420 into the proxy request 411. For example, the proxy request 411 illustrated in FIG. 4A incorporates the prefix information 420 into one or more HTTP headers, not explicitly depicted, of the GET request 411.

The aggregated services 306 of FIG. 3 are configured to detect the inclusion of prefix information 420 in the headers of proxy requests 411. In at least one embodiment, the aggregated services 306 generate encoded responses 313 in accordance with the prefix information 420.

Figure 4B:
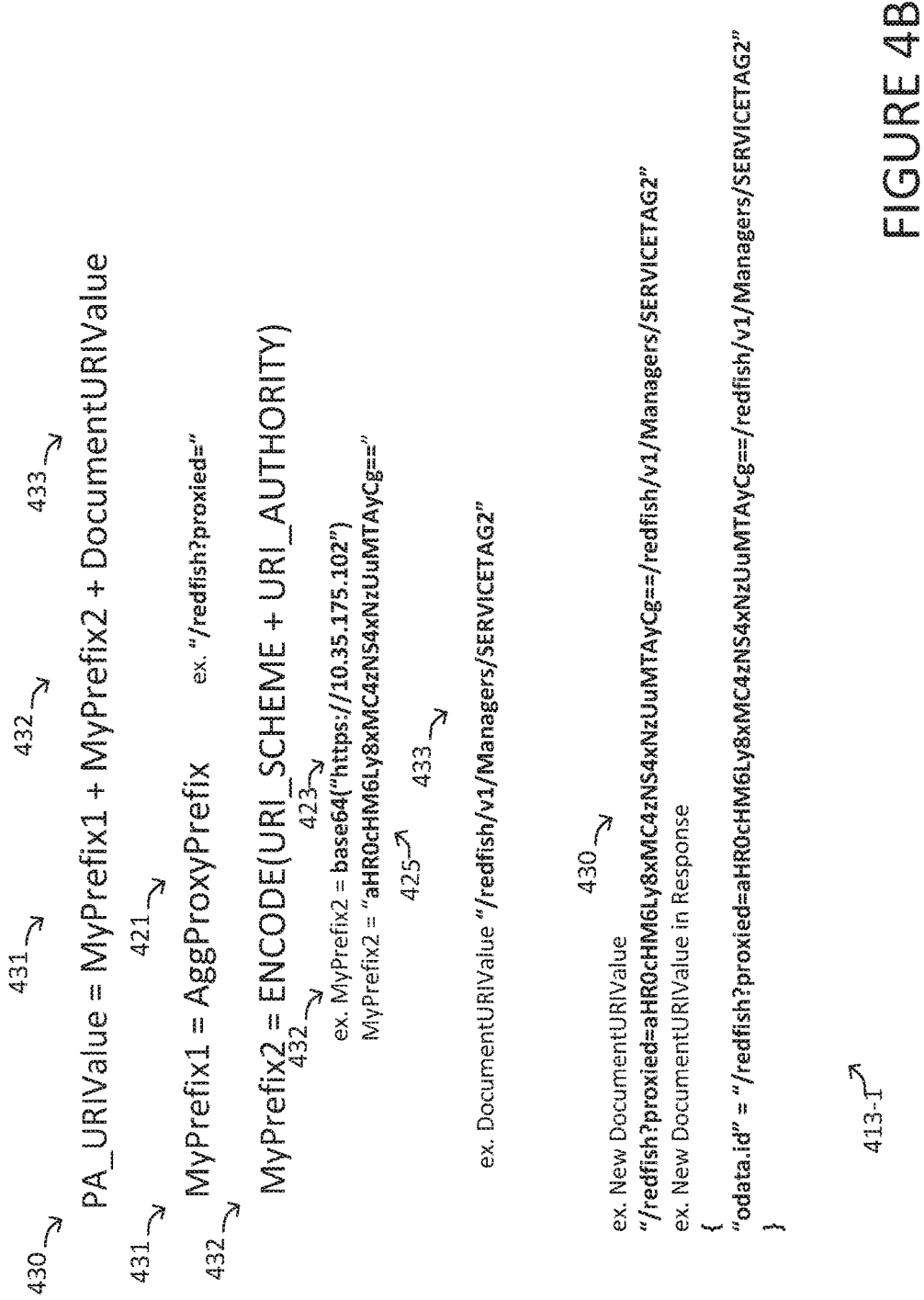

FIG. 4B depicts an example calculation of an encoded response 413-1 corresponding to encoded response 313 of FIG. 3. As depicted in FIG. 4B, an encoded URI reference 430 is calculated as the sum of three components, a first prefix component 431, a second prefix component 432, and a document URI value 433. The first prefix component 431 illustrated in FIG. 4B is equal to the query attribute information 421 of FIG. 4A, i.e., "/redfish?proxied=" in the depicted example. The second prefix component 432 of FIG. 4B is calculated as the base64 encoding of the URI prefix text string 423, i.e., the text string corresponding to the scheme and authority of first aggregated resource 306-1, i.e., the text string "https://10.35.175.102/." FIG. 4B illustrates the base64 encoding 425 of URI prefix text string 423 equal to the value: "aHR0cHM6Ly8xMC4zns4xNzuuMTAyCg=="

FIG. 4B further illustrates the document URI value 433 of the resource requested in first proxy request 311-1 (FIG. 3).

In the FIG. 4B example, document URI value 433 is the text string "/redfish/v1/Mangers/SERVICETAG2." FIG. 4B further depicts encoded URI reference 430 as the concatenation of first prefix component 431, second prefix component 432, and document URI value 433, and incorporated into encoded response 413-1.

The first encoded response 413-1 of FIG. 4B comprises the first encoded response 313-1 returned from first aggregated service 306-1 to aggregator 304. Similarly, as depicted in FIG. 3, a second encoded response 313-2 is returned from second aggregated service 306-2 to aggregator 304. The aggregator 304 consolidates each of the encoded responses 313, as well as its own response encoded response 313-A to client request 110, an example of which is illustrated in FIG. 4C as encoded response 413-A, into a single consolidated aggregated response 315, an example of which is illustrated in FIG. 4C as aggregated response 415, which is returned to client 108.

Because each element of the aggregated response 315 includes encoded prefix information indicative of the prefix of the applicable aggregated service 306, client 108 may thereafter send an encoded client request 317, an example of which is illustrated in FIG. 4C as subsequent request 417, referred to herein as an encoded client request, identifying the aggregator 304 as the targeted resource while including a URI query string including a single attribute-value pair and assigning the encoded text as the value for the query attributed "proxied."

Upon receiving encoded client request 317, aggregator 304 detects the query string assigning a value to the "proxied" query attribute and recognizes the request as an encoded client request. The aggregator 304 may then decode the encoded string to determine the appropriate proxy URI prefix for a corresponding proxy request 318, an example of which is illustrated in FIG. 4C as a resolved proxy request 418. Comparing resolved proxy request 418 with the GET request 218 of FIG. 2, one of ordinary skill will appreciate that the prefix issue introduced by the inclusion of aggregator 104 has been addressed and that the aggregator 304 of FIG. 3 performs the desired aggregation while at the same time, enabling client 108 to generate prefix-aware requests exploring the details of the aggregated system behind aggregator 304.

An additional feature of client 108 is illustrated by the direct request 316 sent from client 108 to first aggregated service 306-1 after receiving consolidated aggregated response 315 from aggregator 304. In this case, aggregator 304 may communicate with first aggregated service 306-1 via either of two network interfaces, one corresponding to the IP address 10.35.175.102 corresponding to the public network interface of first aggregated service 306-1 and the other corresponding to the IP address 192.168.1.102 of the private network, as described above. If aggregator 304 communicates with first aggregated service 306-1 via their respective public network interfaces, the encoded response 313-1 received by aggregator 304 from aggregated service 306-1 will include an encoded URI string corresponding to the public network interface of aggregated service 306-1, an example of which is shown as encoded response 413-1 in FIG. 4C. Upon receiving aggregated response 315 and decoding the encoded text strings, client 108 may recognize that first aggregated service 306-1 includes a network interface that client 108 can target directly, rather than through aggregator 304 as an intermediary. As illustrated in FIG. 3, for example, second aggregated service 306-2 has a network interface, with IP address 10.35.175.102, on public network 121. Here, rather than send a request targeting a resource of first aggregated service 306-1 through aggregator 304, client 108 may decode the encoded string in aggregated response 315 itself to obtain the URI prefix for the public network interface of first aggregated service 306-1 and thereafter, communicate directly with first aggregated service 306-1.

Figure 5:
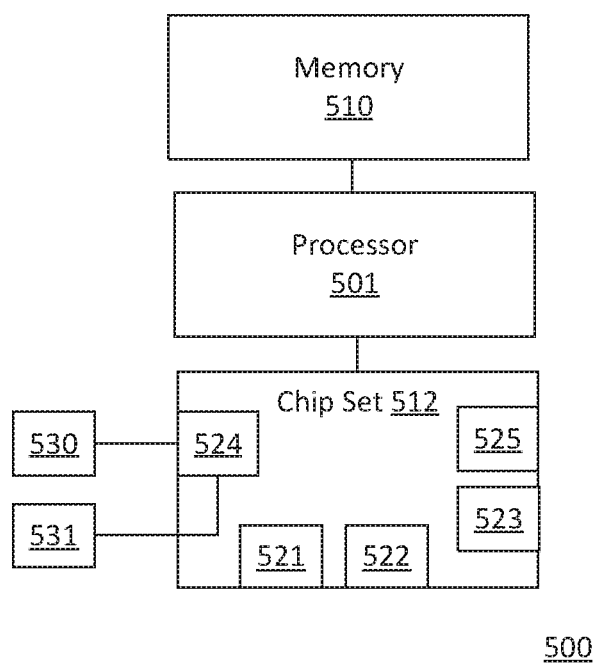
FIG. 5 illustrates elements of an information handling system suitable use as a disclosed prefix aware aggregator.

Each resource illustrated in FIG. 1 and FIG. 3 may correspond to an IHS, an example of which is illustrated in FIG. 5. The example IHS 500 of FIG. 5 includes a processor 501 coupled to a memory 510 and a chipset 512. Chipset 512 couples processor 501 to one or more I/O interfaces including various suitable high speed serial interfaces (I/Fs) including, as examples, a USB I/F 521 and a PCIe I/F 522, various storage device interfaces including, as examples, a SATA interface 523 coupled to one or more SATA hard drives (not depicted), a SCSI interface 525 coupled to one or more SCSI hard drives (not depicted), and one or more solid state drives (not depicted) coupled to PCIe I/F 522, a suitable low bandwidth interface 524, e.g., LPC or SPI, that may couple processor 501 to flash memory 530, a BMC or other type of service processor 531, or both. Depending upon the implementation, IHS 500 may include any one or more of various I/O devices (not depicted) including, as non-limiting examples, a display device and a corresponding graphics processor, a keyboard, mouse, speakers, microphone, and so forth, as well as one or more persistent mass storage devices including solid state drive devices, SCSI drives, and SATA drives.

Any one or more processes or methods described above, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. IHSs may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A method of managing information handling system resources, the method comprising:
   receiving, by an aggregator resource from a client, a client request indicating a uniform resource identifier (URI) corresponding to a requested service; and
   sending a plurality of proxy requests, including a proxy request corresponding to each of a plurality of aggregated resources associated with the aggregator resource, wherein each of the plurality proxy requests includes:
      a proxy URI indicative of the requested service on one of the plurality of aggregated resources; and
      encoding information indicative of an encoding method; and
   receiving, a plurality of encoded responses, including an encoded response from each of the plurality of aggregated resources, wherein each of the plurality of encoded responses includes:
      a document URI indicating a value of the requested service for the aggregated resource; and
      prefix information including an encoded reference to the aggregated resource, the encoded reference encoded in accordance with the encoding method.

2. The method of claim 1, further comprising:
   including each encoded response in an aggregated response; and
   forwarding the aggregated response to the client.

3. The method of claim 2, further comprising:
   responsive to receiving an encoded client request including one of the encoded references, determining, from the encoded reference, a particular aggregated resource.

4. The method of claim 2, further comprising:
   generating, by the aggregator resource, an aggregator response to the client request; and
   including the aggregator response in the aggregated response.

5. The method of claim 1, wherein the encoded reference includes an encoding of a URI prefix of the aggregated resource, encoded in accordance with the encoding method.

6. The method of claim 1, wherein the proxy URI includes:
   a URI prefix of the aggregated resource; and
   a URI path from the client request.

7. The method of claim 6, wherein the encoded reference includes a text string comprising a concatenation of:
   the query attribute identifier;
   the encoding of the URI prefix of the aggregated resource; and
   the document URI.

8. The method of claim 1, wherein the prefix information further includes information identifying a query attribute.

9. The method of claim 1, wherein the requested service comprises a service provided by a representational state transfer (REST)-compliant application programming interface (API).

10. The method of claim 9, wherein the encoded client request indicates a subsequent service of the REST-compliant API and wherein the method further includes:
    sending a directed request for the subsequent service to the particular aggregated resource; and
    responsive to receiving a response to the directed request, forwarding the response to the client.

11. The method of claim 1, wherein each proxy request includes a header portion and a payload portion and wherein each proxy conveys the prefix information in the header portion.

12. A method of accessing an application programming interface (API), the method comprising:
    sending, by a client resource, a client request to an aggregator, the client request indicating a uniform resource identifier (URI) corresponding to a requested service;
    receiving, from the aggregator, an aggregated response wherein the aggregated response is indicative of a plurality of aggregated responses received by the aggregator from a corresponding plurality of aggregated services associated with the aggregator, wherein each of the plurality of aggregated responses includes:
       a document URI indicating a value of the requested service for the aggregated resource; and
       an encoded reference to the aggregated resource, the encoded reference encoded in accordance with a particular encoding algorithm; and
    sending, to the aggregator, an encoded client request for a subsequent service corresponding to the document URI, wherein the encoded client request includes a particular one of the encoded references corresponding to a particular aggregated resource; and
    receiving, from the aggregator, a response to the encoded client request for the subsequent service, the response comprising information regarding the subsequent service on the particular aggregated resource.

13. The method of claim 12, further comprising:
    sending, by the client resource, a discover request indicating a URI corresponding to a root service of an API; and
    receiving, from the aggregator, a service document including encoding information including information indicative of the encoding algorithm.

14. The method of claim 13, further comprising:
    decoding, by the client resource, a particular one of the encoded references to recover a URI prefix of a particular aggregated resource; and
    generating a client request including a URI of the particular aggregated resource.

15. The method of claim 12, wherein the encoded reference includes a text string comprising a concatenation of:
    the query attribute identifier;
    the encoding of the URI prefix of the aggregated resource; and
    the document URI.

16. An aggregator resource, comprising:
    a processor;
    a storage medium, accessible to the processor, wherein the storage medium includes processor executable program instructions, that, when executed, cause the processor to perform operations including:

receiving, by the aggregator resource from a client, a client request indicating a uniform resource identifier (URI) corresponding to a requested service; and sending a plurality of proxy requests, including a proxy request corresponding to each of a plurality of aggregated resources associated with the aggregator resource, wherein each of the plurality proxy requests includes:

a proxy URI indicative of the requested service on one of the plurality of aggregated resources; and encoding information indicative of an encoding method; and receiving, a plurality of encoded responses, including an encoded response from each of the plurality of aggregated resources, wherein each of the plurality of encoded responses includes:

a document URI indicating a value of the requested service for the aggregated resource; and prefix information including an encoded reference to the aggregated resource, the encoded reference encoded in accordance with the encoding method.

17. The method of claim 16, wherein the proxy request includes a proxy request header portion and a proxy request payload portion and wherein the prefix information is included in the prefix portion.

18. The method of claim 16, wherein the encoded response indicates the encoding as the value for prefix attribute and includes the document URI.

19. The method of claim 16, wherein the encoding method comprises at least a portion of the proxy URI comprises encoding the URI prefix of the aggregated resource.

* * * * *